(12) United States Patent
Imaei (10) Patent No.: US 12,449,625 B2
(45) Date of Patent: Oct. 21, 2025

(54) LENS BARREL AND IMAGING APPARATUS

(71) Applicant: NIKON CORPORATION, Tokyo (JP)

(72) Inventor: Ichiro Imaei, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 393 days.

(21) Appl. No.: 18/026,017

(22) PCT Filed: Sep. 13, 2021

(86) PCT No.: PCT/JP2021/033505
§ 371 (c)(1),
(2) Date: Mar. 13, 2023

(87) PCT Pub. No.: WO2022/070855
PCT Pub. Date: Apr. 7, 2022

(65) Prior Publication Data
US 2023/0358990 A1 Nov. 9, 2023

(30) Foreign Application Priority Data

Sep. 29, 2020 (JP) ................................ 2020-163330

(51) Int. Cl.
*G02B 7/02* (2021.01)
*G02B 5/00* (2006.01)

(52) U.S. Cl.
CPC ............... *G02B 7/02* (2013.01); *G02B 5/005* (2013.01)

(58) Field of Classification Search
CPC ............. G02B 7/02; G02B 5/005; G03B 9/06
See application file for complete search history.

(56) References Cited

U.S. PATENT DOCUMENTS

2017/0242318 A1* 8/2017 Sato ..................... H04N 23/687
2021/0278571 A1 9/2021 Shimizu et al.

FOREIGN PATENT DOCUMENTS

| JP | H04-128727 A | 4/1992 |
|---|---|---|
| JP | H06-67259 A | 3/1994 |
| JP | 2010-020174 A | 1/2010 |
| JP | 2017-151234 A | 8/2017 |
| JP | 2019-173291 A | 10/2019 |
| JP | 2020-020174 A | 2/2020 |
| WO | 2020/003922 A1 | 1/2020 |
| WO | 2020/170585 A1 | 8/2020 |

OTHER PUBLICATIONS

Oct. 19, 2021 International Search Report issued in International Patent Application No. PCT/JP2021/033505.
Mar. 28, 2023 International Preliminary Report on Patentability issued in International Patent Application No. PCT/JP2021/033505.
Mar. 19, 2024 Office Action issued in Japanese Patent Application No. 2022-553767.

* cited by examiner

Primary Examiner — James C. Jones
(74) Attorney, Agent, or Firm — Oliff PLC (57) ABSTRACT

In order to reduce the noise of a lens barrel, the lens barrel includes a plurality of diaphragm blades, a driver driving the plurality of diaphragm blades, a first opening member that holds the driver, a second opening member including a plurality of facing portions opposed to the first opening member in an optical axis direction, and a plurality of buffer members disposed between the first opening member and the plurality of facing portions, respectively, wherein the plurality of buffer members position the first opening member with respect to the second opening member.

19 Claims, 7 Drawing Sheets

LENS BARREL AND IMAGING APPARATUS

TECHNICAL FIELD

The present disclosure relates to a lens barrel and an imaging apparatus.

BACKGROUND ART

A lens barrel is provided with a diaphragm device (see, for example, Patent Document 1). The noise reduction of the lens barrel is required.

PRIOR ART DOCUMENT

Patent Document

Patent Document 1: Japanese Patent Application Laid-Open No. 04-128727

SUMMARY OF THE INVENTION

According to a first aspect, a lens barrel includes: a plurality of diaphragm blades; a driver driving the plurality of diaphragm blades; a first opening member that holds the driver; a second opening member including a plurality of facing portions opposed to the first opening member in an optical axis direction; and a plurality of buffer members disposed between the first opening member and the plurality of facing portions, respectively; wherein the plurality of buffer members position the first opening member with respect to the second opening member.

According to a second aspect, an imaging apparatus includes: the above-mentioned lens barrel; and an imaging element.

Note that the configuration of the embodiment described below may be appropriately modified, and at least a part thereof may be replaced with another configuration. Further, constituent elements whose arrangement is not particularly limited are not necessarily arranged as disclosed in the embodiments, and can be arranged at positions where the functions thereof can be achieved.

MODES FOR CARRYING OUT THE INVENTION

Hereinafter, a lens barrel according to an embodiment will be described with reference to the drawings. In the drawings illustrated below, an XYZ orthogonal coordinate system is appropriately provided to facilitate explanation and understanding. In this coordinate system, a direction from a subject toward a camera body 10 side at a camera position (hereinafter referred to as a normal position) when a photographer takes a horizontally long image with an optical axis OA being horizontal is defined as a +X direction. Further, a direction toward a right side at the normal position is defined as a +Y direction. Further, a direction toward an upper side at the normal position is defined as a +Z direction. Note that the shapes, the lengths and the thicknesses of the respective portions illustrated in the embodiments do not necessarily correspond to the actual portions, and portions not required for description are appropriately omitted or simplified.

Figure 1:
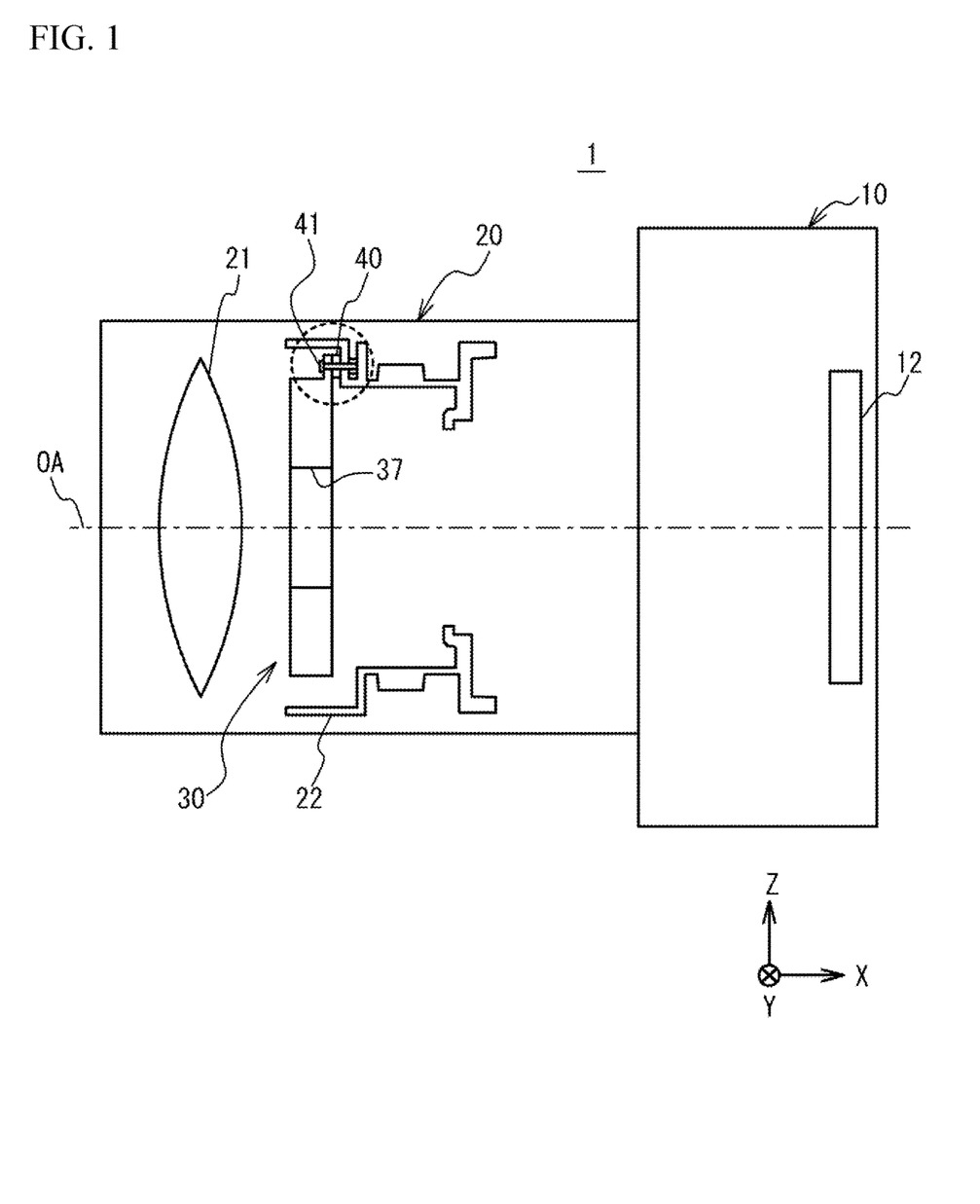
FIG. 1 is a diagram illustrating a camera including a lens barrel and a camera body according to an embodiment.

FIG. 1 is a schematic diagram of a camera 1 including a lens barrel 20 according to the present embodiment. The camera 1 includes the camera body 10 and the lens barrel 20 attachable to and detachable from the camera body 10. Note that the lens barrel 20 and the camera body 10 may be integrated.

The lens barrel 20 includes a lens 21 as an optical member that refracts incident subject light to form a subject image on an emission side, and a diaphragm device 30 that adjusts an aperture size of the lens 21. The diaphragm device 30 is attached to a fixed barrel 22 via a buffer member 40 by a screw 41. Although the lens 21 is illustrated as a single lens in FIG. 1, it may be composed of a plurality of lenses. Although only a single lens group is illustrated in FIG. 1, a plurality of lens groups may be provided. The plurality of lens groups may be disposed closer to the camera body 10 than the diaphragm device 30, or may be disposed both closer to the subject and the camera body 10 than the diaphragm device 30.

The camera body 10 includes an imaging element 12 that images a subject image formed by the lens 21 and converts the image into an electric signal.

Figure 2:
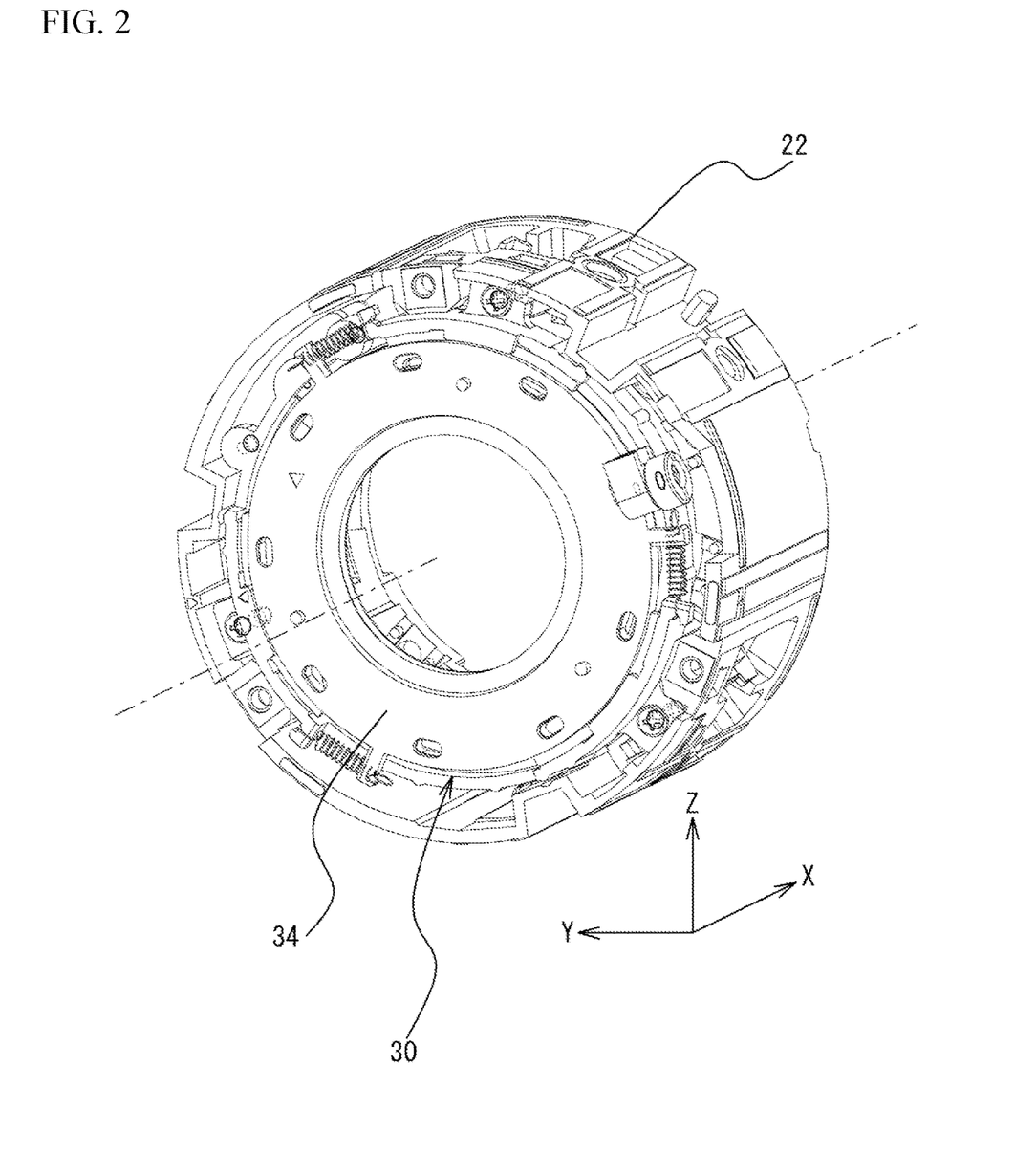
FIG. 2 is a perspective view illustrating a state in which a diaphragm device according to the embodiment is attached to a fixed barrel.

Next, the configuration of the diaphragm device 30 according to the present embodiment will be described. FIG. 2 is a perspective view illustrating a state in which the diaphragm device 30 according to the embodiment is attached to the fixed barrel 22, and FIG. 3 is an exploded perspective view of FIG. 2.

As illustrated in FIG. 2, in the present embodiment, the diaphragm device 30 is disposed in the fixed barrel 22, and the diaphragm device 30 and the fixed barrel 22 are not in contact with each other in a radial direction. That is, a clearance (gap) is provided over the entire circumference between an inner wall of the fixed barrel 22 and an outer peripheral surface of the diaphragm device 30 (more specifically, an opening member 31 described later). Also in the optical axis OA direction, there is a gap between the diaphragm device 30 and the fixed barrel 22, and they are not in contact with each other.

Figure 3:
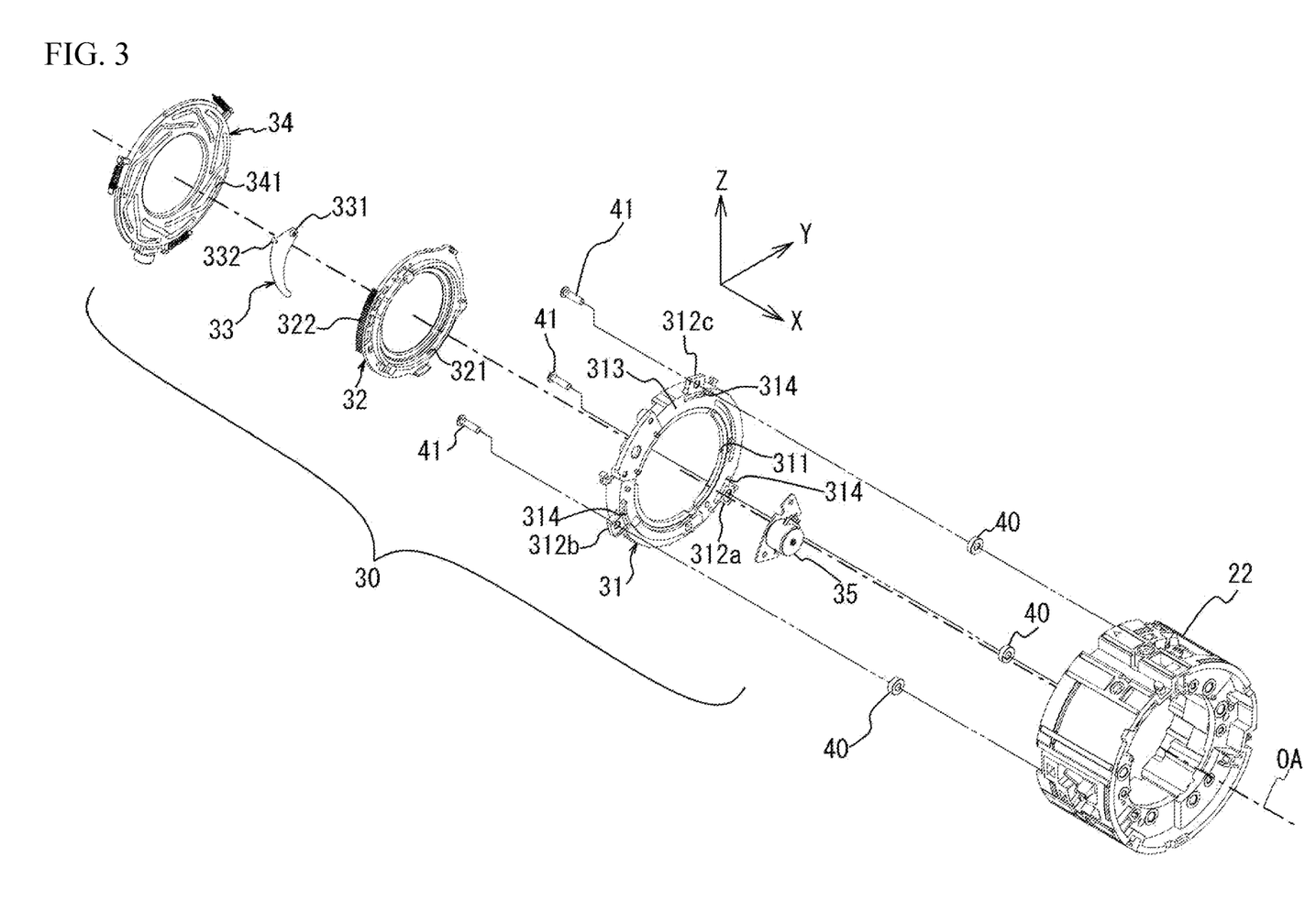
FIG. 3 is an exploded perspective view of FIG. 2.

As illustrated in FIG. 3, the diaphragm device 30 is a iris diaphragm device, and includes the opening member 31, a rotating member 32, a plurality of diaphragm blades 33 (only one is illustrated in FIG. 3), a cam plate 34, and a stepping motor 35.

The opening member 31 is an annular member and includes a main body 313, a first protruding portion 312a, a second protruding portion 312b and a third protruding portion 312c that protrude from the main body 313 in a direction intersecting with the optical axis OA. The main body 313 has a fitting opening portion 311 in the center thereof. The stepping motor 35 is attached to a +X side of the main body 313. Details of the first protruding portion 312a, the second protruding portion 312b and the third protruding portion 312c will be described later.

The rotating member 32 is an annular member and has an annular protruding portion 321 at the center to be fitted into the fitting opening portion 311 of the opening member 31. A segment gear 322 is formed on an outer edge of the rotating member 32, and engages with a pinion gear (not illustrated) attached to a rotating shaft of the stepping motor 35.

A supporting portion 331 is provided on the +X side of each of the diaphragm blades 33, and a cam follower 332 is provided on the −X side of each of the diaphragm blades 33. The supporting portion 331 is inserted into a hole (not illustrated) provided on the −X side of the rotating member 32, and the cam follower 332 is inserted into a cam 341 provided on the cam plate 34.

When an instruction to change an F-value is given, the stepping motor 35 is rotationally driven, and the rotating member 32 having the segment gear 322 engaging with the pinion gear attached to the rotating shaft of the stepping motor 35 is rotated. Since the supporting portion 331 of the diaphragm blade 33 is inserted into the hole formed on the −X side of the rotating member 32, when the rotating member 32 rotates around the optical axis, the diaphragm blade 33 also rotates around the optical axis. Since the cam follower 332 of the diaphragm blade 33 is inserted into the cam 341 of the cam plate 34, the cam follower 332 of the diaphragm blade 33 rotates along the cam 341 with the supporting portion 331 as a fulcrum. When a focal length is changed, the cam plate 34 is rotated by a mechanical mechanism (not illustrated), and the cam follower 332 of the diaphragm blade 33 rotates along the cam 341 with the supporting portion 331 as the fulcrum. Thus, the size of an aperture 37 (see FIG. 1) of the iris diaphragm can be adjusted by the plurality of diaphragm blades 33.

The diaphragm device 30 configured as described above is attached to the fixed barrel 22 using the first protruding portion 312a, the second protruding portion 312b and the third protruding portion 312c of the opening member 31.

Figure 4:
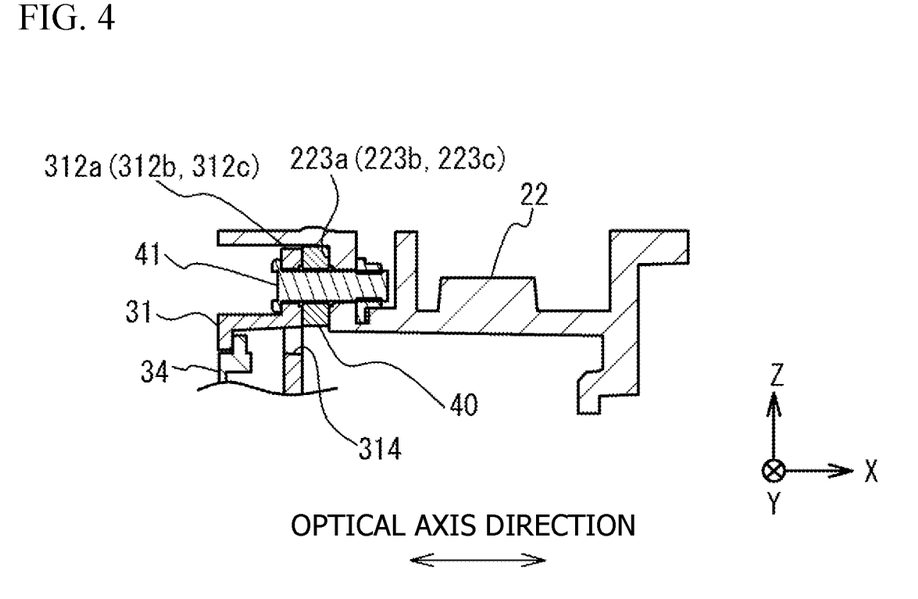
FIG. 4 is an enlarged cross-sectional view of a portion surrounded by a dotted line in FIG. 1.

FIG. 4 is an enlarged cross-sectional view of a portion surrounded by a dotted line in FIG. 1. As illustrated in FIG. 4, the fixed barrel 22 has a first facing portion 223a, a second facing portion 223b, and a third facing portion 223c at positions opposed to the first protruding portion 312a, the second protruding portion 312b, and the third protruding portion 312c in the optical axis OA direction. In the following description, the first facing portion 223a, the second facing portion 223b, and the third facing portion 223c are referred to as facing portions 223 when there is no need to make any particular distinction.

The diaphragm device 30 is attached to the fixed barrel 22 by the screws 41 or the like with the annular buffer members 40 interposed between the first protruding portion 312a, the second protruding portion 312b and the third protruding portion 312c of the opening member 31 and the plurality of facing portions 223 of the fixed barrel 22.

In order to realize noise reduction of the lens barrel 20, it is desirable that vibration generated by driving the diaphragm blades 33 is not transmitted to the fixed barrel 22 as much as possible. Therefore, it may be conceivable to make the buffer member 40 from, for example, rubber. However, when the buffer member 40 is made of rubber, the rubber buffer member 40 is easily deformed, so that the position of the diaphragm device 30 with respect to the fixed barrel 22 is not determined both in the optical axis OA direction (X direction) and in planar directions (Y and Z directions) orthogonal to the optical axis. In other words, the buffer member 40 cannot be used for positioning the diaphragm device 30. Therefore, a configuration is required for positioning the diaphragm device 30 at a predetermined position with respect to the fixed barrel 22. For example, as positioning in the X direction, the opening member 31 and the fixed barrel 22 are provided with contact seating surfaces, and the contact seating surfaces are positioned so that they are in contact with each other. As positioning in the Y and Z directions, a positioning boss (protrusion) is provided in the opening member 31 of the diaphragm device 30, a hole into which the boss is inserted is provided in the fixed barrel 22, and the positioning is performed by fitting the boss and the hole. However, in this case, since the diaphragm device 30 and the fixed barrel 22 are in contact with each other, the vibration generated by driving the diaphragm blades 33 is directly transmitted from the diaphragm device 30 to the fixed barrel 22, and noise reduction of the lens barrel 20 may be insufficient.

Therefore, in the present embodiment, the buffer member 40 is made of engineering plastic or super engineering plastic.

Here, the engineering plastic is a plastic having a heat resistance of 100° C. or higher, a tensile strength of 49.0 MPa or higher, and a bending elastic modulus of 2.4 GPa or higher. Examples of the engineering plastic include polyacetal (POM), polycarbonate (PC), modified polyphenylene ether (m-PPE), polyamide (PA), and polybutylene terephthalate (PBT).

The super engineering plastic is a plastic that satisfies the condition of engineering plastic and has a heat resistance of 150° C. or higher. Examples of the super engineering plastic include polyphthalamide (PPA), polyphenylene sulfide (PPS), liquid crystal polymer (LCP), polysulfone (PSU), polyethersulfone (PES), polyetherimide (PEI), polyamideimide (PAI), polyetheretherketone (PEEK), and polytetrafluoroethylene (PTFE).

The buffer member 40 made of the engineering plastic or super engineering plastic is hard to deform. That is, the outside dimensions (thickness in the optical axis OA direction and size in the direction perpendicular to the optical axis) of the buffer member 40 before assembling the lens barrel 20 are substantially equal to the outside dimensions of the buffer member 40 after assembling the lens barrel 20 (after the diaphragm device 30 is fixed to the fixed barrel 22). Further, after the diaphragm device 30 is fixed to the fixed barrel 22, the buffer member 40 is not easily deformed by impact or vibration. Therefore, by sandwiching the buffer member 40 according to the present embodiment between the diaphragm device 30 and the fixed barrel 22, the position of the diaphragm device 30 with respect to the fixed barrel 22 in the optical axis OA direction can be positioned at the predetermined position (design position). That is, the buffer member 40 functions as a positioning member in the optical axis OA direction of the diaphragm device 30 with respect to the fixed barrel 22. Further, the buffer member 40 also functions as a spacer for preventing the fixed barrel 22 and the diaphragm device 30 from being in contact with each other in the optical axis OA direction.

Next, the positioning of the diaphragm device 30 in a plane perpendicular to the optical axis OA of the lens barrel 20 will be described.

Figure 5A:
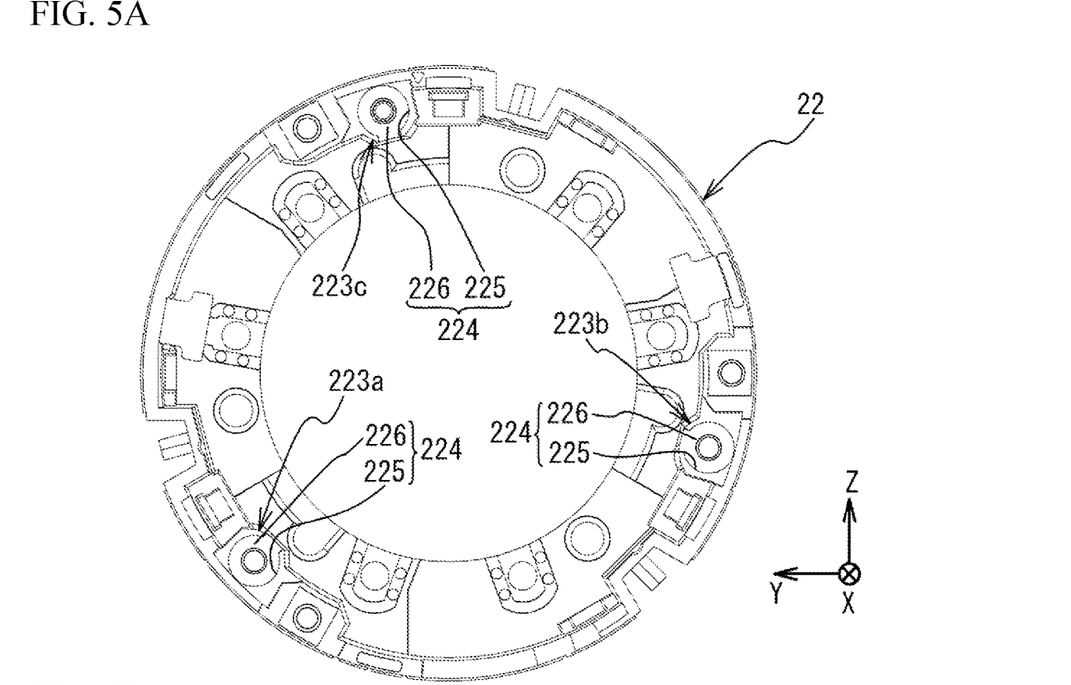
FIG. 5A is a view of the fixed barrel viewed from a subject side.
Figure 5B:
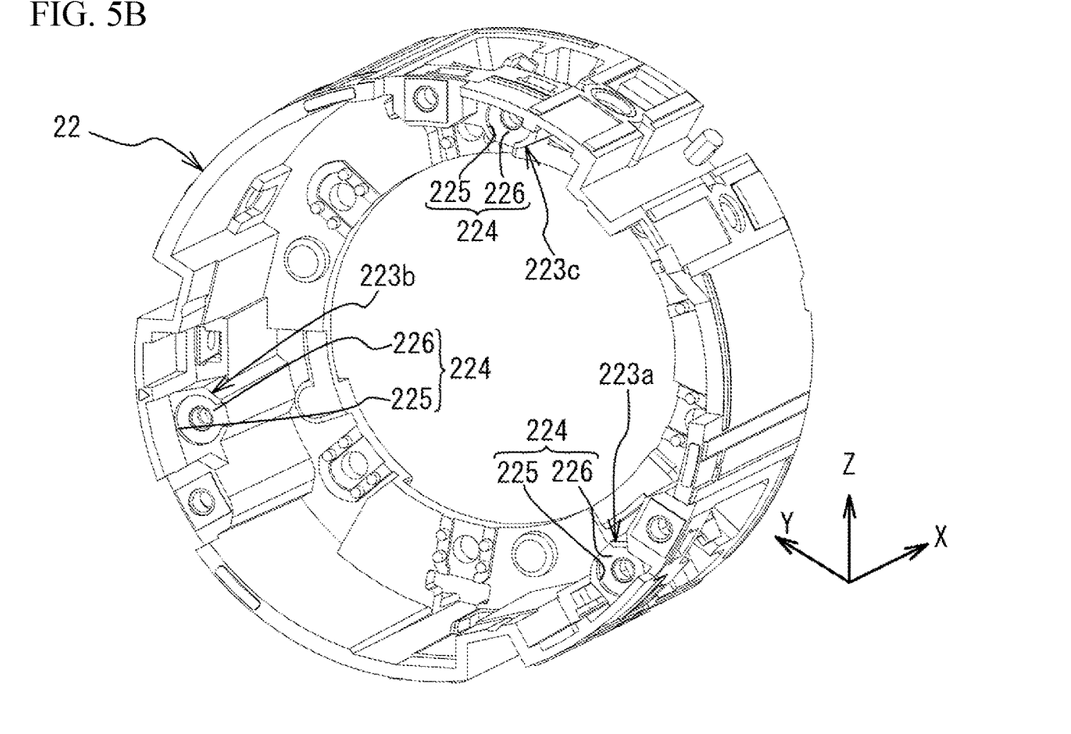
FIG. 5B is a perspective view of the fixed barrel.
Figure 6A:
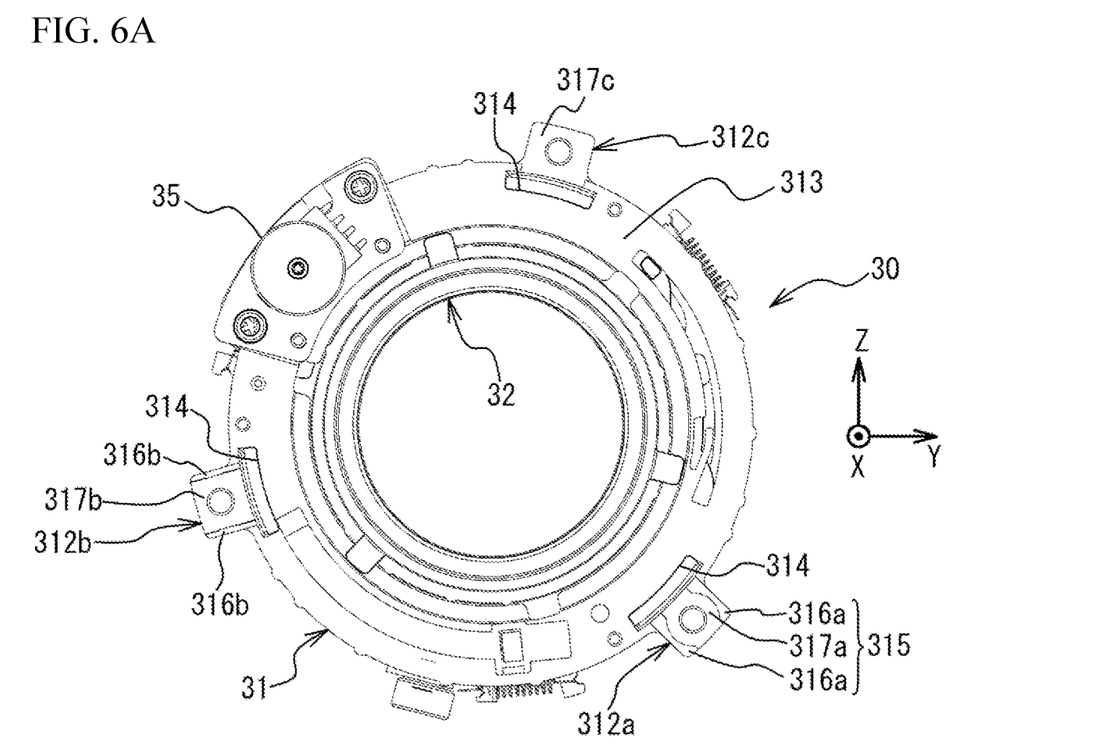
FIG. 6A is a view of the fixed barrel viewed from a camera body side.
Figure 6B:
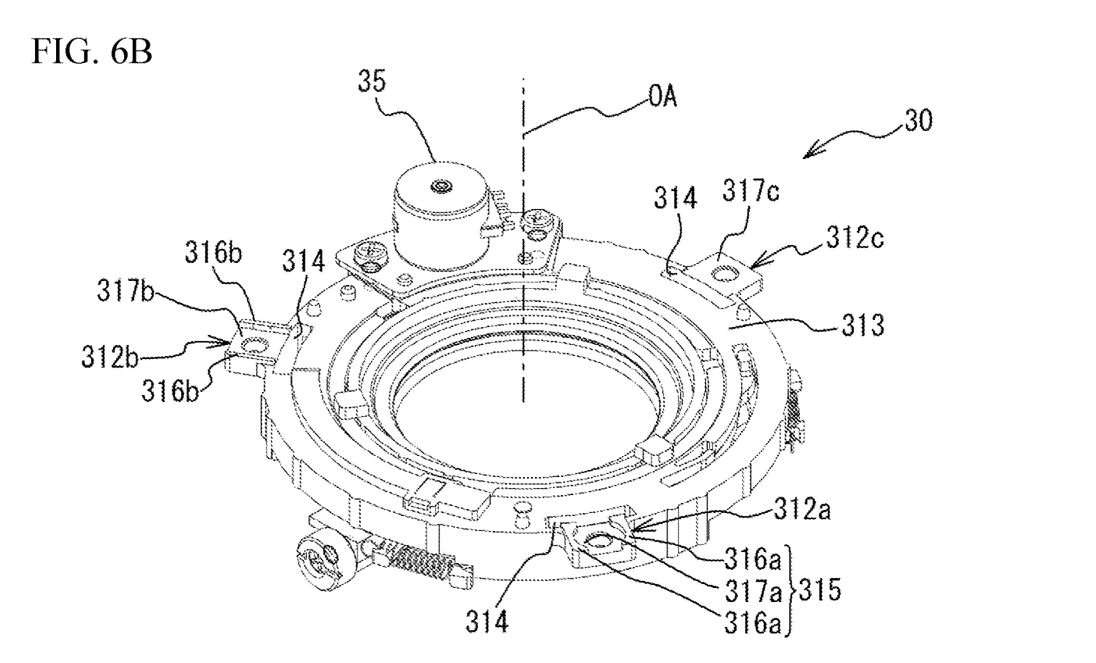
FIG. 6B is a perspective view of the diaphragm device.
Figure 7A:
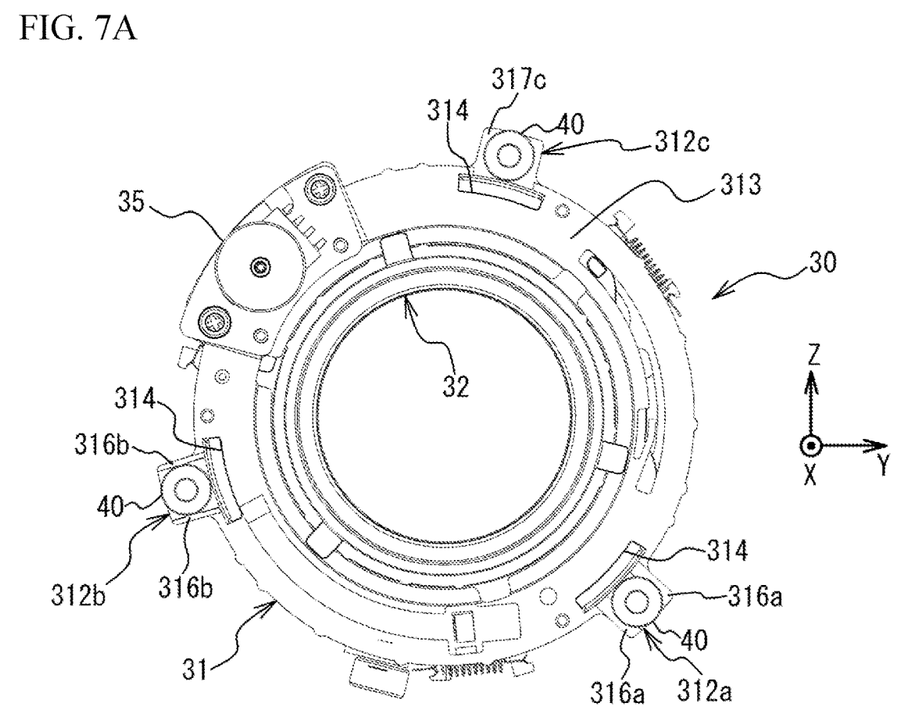
FIG. 7A is a plan view illustrating a relationship between the diaphragm device and a buffer member.
Figure 7B:
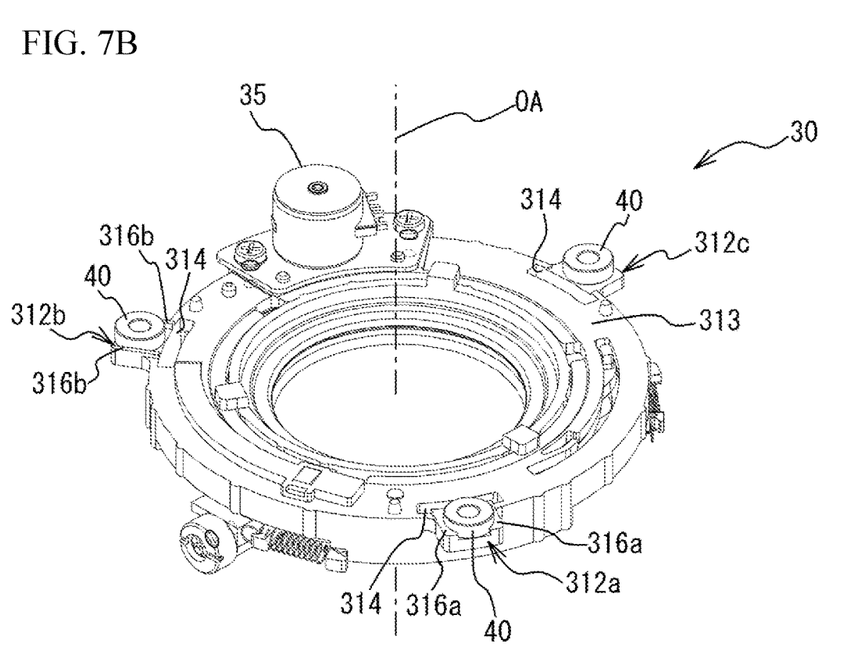
FIG. 7B is a perspective view illustrating the relationship between the diaphragm device and the buffer member.

FIG. 5A is a view of the fixed barrel 22 viewed from the subject side, and FIG. 5B is a perspective view of the fixed barrel 22. FIG. 6A is a view of the diaphragm device 30 viewed from the camera body 10 side, and FIG. 6B is a perspective view of the diaphragm device 30. FIG. 7A is a plan view illustrating the relationship between the diaphragm device 30 and the buffer member 40, and FIG. 7B is a perspective view illustrating the relationship between the diaphragm device 30 and the buffer member 40.

As illustrated in FIGS. 5A and 5B, in the fixed barrel 22, fitting portions 224 into which the buffer members 40 are fitted are formed in the first facing portion 223a, the second facing portion 223b and the third facing portion 223c, which face the first protruding portion 312a, the second protruding portion 312b, and the third protruding portion 312c in the optical axis OA direction, respectively. The fitting portion 224 has a wall portion 225 extending in the optical axis OA direction and fitting with at least a part of the outer periphery of the buffer member 40. The fitting portion 224 has a seating surface 226 in contact with the buffer member 40 in the optical axis OA direction. The wall portion 225 fixes the position of the buffer member 40 with respect to the fixed barrel 22 in the plane perpendicular to the optical axis OA. The seating surface 226 fixes the position of the buffer member 40 with respect to the fixed barrel 22 in the optical axis OA direction.

On the other hand, in the diaphragm device 30, as illustrated in FIGS. 6A and 6B, a fitting portion 315 fitting with the buffer member 40 is formed in the first protruding portion 312a of the opening member 31. As illustrated in FIGS. 7A and 7B, the fitting portion 315 has a wall portion 316a extending in the optical axis OA direction and fitting with at least a part of the outer periphery of the buffer member 40. Further, the fitting portion 315 has a seating surface 317a in contact with the buffer member 40 in the optical axis OA direction. The wall portion 316a fixes the position of the buffer member 40 with respect to the opening member 31 in the plane perpendicular to the optical axis OA, and the seating surface 317a fixes the position of the buffer member 40 with respect to the opening member 31 in the optical axis OA direction.

Thus, when the buffer member 40 is arranged in the fitting portion 315 of the first protruding portion 312a and the fitting portion 224 of the first facing portion 223a of the fixed barrel 22, the position of the diaphragm device 30 with respect to the fixed barrel 22 in the plane perpendicular to the optical axis OA can be positioned at the predetermined position (design position) in a direction other than the direction in which the opening member 31 rotates around the first protruding portion 312a as a fulcrum.

As illustrated in FIGS. 7A and 7B, a wall portion 316b that extends in the optical axis OA direction and is in contact with the outer periphery of the buffer member 40 in the circumferential direction of a circle centered on the optical axis OA is formed in the second protruding portion 312b. Further, as illustrated in FIGS. 6A and 6B, a seating surface 317b in contact with the buffer member 40 in the optical axis OA direction is formed. The wall portion 316b fixes the position of the buffer member 40 with respect to the opening member 31 in the circumferential direction of the circle centered on the optical axis OA, and the seating surface 317b fixes the position of the buffer member 40 with respect to the opening member 31 in the direction of the optical axis OA. When the buffer member 40 is arranged in the second protruding portion 312b and the fitting portion 224 of the second facing portion 223b of the fixed barrel 22, the opening member 31 is restricted from moving in the circumferential direction of the circle centered on the optical axis OA with respect to the fixed barrel 22 by the wall portion 316b. That is, the movement of the opening member 31 is restricted by the wall portion 316b and the buffer member 40 in the direction in which the opening member 31 rotates around the first protruding portion 312a as a fulcrum. Thus, the position of the diaphragm device 30 in the plane perpendicular to the optical axis OA can be determined by the buffer member 40, the wall portion 316a and the wall portion 316b.

On the other hand, the third protruding portion 312c is not formed with the wall portion 316a or the wall portion 316b that is in contact with the outer periphery of the buffer member 40. That is, the third protruding portion 312c does not have a wall portion extending in the optical axis OA direction. This is to avoid excessive restraint of the diaphragm device 30. As illustrated in FIGS. 6A and 6B, the third protruding portion 312c is formed with a seating surface 317c in contact with the buffer member 40 in the optical axis OA direction. When the buffer member 40 is disposed in the third protruding portion 312c and the fitting portion 224 of the third facing portion 223c of the fixed barrel 22, the position of the opening member 31 with respect to the fixed barrel 22 in the optical axis OA direction is fixed by the seating surface 317c.

By configuring the first protruding portion 312a, the second protruding portion 312b and the third protruding portion 312c in this manner, the positioning of the diaphragm device 30 with respect to the fixed barrel 22 in the plane perpendicular to the optical axis OA can be performed using the buffer members 40 without providing the positioning boss (protrusion) or the hole into which the boss is inserted.

As described above, in the present embodiment, since the position of the diaphragm device 30 in the optical axis OA direction and in the plane perpendicular to the optical axis OA can be positioned at the predetermined position by using the buffer members 40 whose outside dimensions hardly change, it is unnecessary to separately provide the diaphragm device 30 and the fixed barrel 22 with a configuration for positioning (the contact seating surface or the boss). Since no configuration for positioning (the contact seating surface or the boss) is provided, the diaphragm device 30 and the fixed barrel 22 are not in contact with each other.

As described above, the gap is provided over the entire circumference between the inner wall of the fixed barrel 22 and the outer peripheral surface of the diaphragm device 30 (opening member 31). Further, since no configuration for positioning is provided because of the configurations such as the buffer members 40, the first protruding portion 312a, the second protruding portion 312b, the third protruding portion 312c, the fitting portion 224, and the like, the fixed barrel 22 and the diaphragm device 30 are not in contact with each other in the optical axis OA direction and in the plan direction perpendicular to the optical axis OA. Therefore, the diaphragm device 30 (opening member 31) and the fixed barrel 22 are not in contact with each other. As a result, the vibration generated by driving the diaphragm blades 33 is not directly transmitted from the diaphragm device 30 to the fixed barrel 22, so that noise reduction of the lens barrel 20 can be realized.

Further, in the present embodiment, a material having a vibration transmission rate lower than that of the material of the fixed barrel 22 among the above-described engineering plastic and super engineering plastic is used as the material of the buffer member 40. Thereby, the buffer member 40 can absorb the vibration generated by driving the diaphragm blades 33, and the vibration can be inhibited from being transmitted to the fixed barrel 22, so that further noise reduction of the lens barrel 20 can be realized.

Further, in the present embodiment, as illustrated in FIGS. 6A to 7B, the main body 313 of the opening member 31 has slits 314 extending in the circumferential direction at positions opposed to the first protruding portion 312a, the second protruding portion 312b, and the third protruding portion 312c in the radial direction. Thus, for example, portions existing between the first protruding portion 312a, the second protruding portion 312b and the third protruding portion 312c, and the slits 314 function like a plate spring to absorb vibration, so that transmission of vibration to the fixed barrel 22 can be further suppressed, and further noise reduction of the lens barrel 20 can be realized.

As described above in detail, according to the present embodiment, the lens barrel 20 includes the plurality of diaphragm blades 33, the stepping motor 35 configured to drive the plurality of diaphragm blades 33, the opening member 31 that holds the stepping motor 35, the fixed barrel 22 including a plurality of facing portions 223 opposed to the opening member 31 in the optical axis OA direction, and the plurality of buffer members 40 disposed between the opening member 31 and the plurality of facing portions 223, respectively, wherein the plurality of buffer members 40 position the opening member 31 with respect to the fixed barrel 22. The buffer members 40 allow the opening member 31 to be positioned with respect to the fixed barrel 22 without causing the opening member 31 to be in direct contact with the fixed barrel 22, thereby suppressing transmission of vibration generated by driving the diaphragm blades 33 to the fixed barrel 22 and reducing the noise of the lens barrel 20. The motor for driving the diaphragm blades is not limited to the stepping motor, but may be a DC motor, an ultrasonic motor or the like.

Further, in the present embodiment, the opening member 31 and the fixed barrel 22 are not in contact with each other. As a result, since the vibration generated by driving the diaphragm blades 33 is not directly transmitted to the fixed barrel 22, the noise of the lens barrel 20 can be reduced.

In the present embodiment, the outside dimension of each of the plurality of buffer members 40 before the assembly of the lens barrel 20 and the outside dimension of each of the plurality of buffer members 40 after the assembly of the lens barrel 20 are substantially equal to each other. Since the outside dimensions of each of the buffer members 40 before and after the assembly of the lens barrel 20 are substantially equal to each other, the buffer members 40 can be used for positioning the diaphragm device 30.

Further, in the present embodiment, the plurality of buffer members 40 are members having a vibration transmission rate lower than that of the member of the fixed barrel 22. As a result, the buffer members 40 can absorb the vibration generated by driving the diaphragm blades 33, and the vibration can be inhibited from being transmitted to the fixed barrel 22, so that further noise reduction of the lens barrel 20 can be realized.

Further, in the present embodiment, the opening member 31 has the fitting portion 315 fitted with the buffer member 40 at a position opposed to the first facing portion 223a of the plurality of facing portions 223 in the optical axis OA direction. Thus, when the lens barrel 20 is assembled, the diaphragm device 30 can be positioned in the plane perpendicular to the optical axis OA in a direction other than the direction in which the opening member 31 rotates around the buffer member 40 fitted in the fitting portion 315.

In the present embodiment, the fitting portion 315 includes the wall portion 316a extending in the optical axis direction and fitting with at least a part of the buffer member 40. Thus, the opening member 31 can be inhibited from moving with respect to the fixed barrel 22 in the circumferential direction and the radial direction of the circle centered on the optical axis OA.

In the present embodiment, the opening member 31 has the wall portion 316b that is in contact with at least a part of the buffer member 40 at a position opposed to the second facing portion 223b of the plurality of facing portions 223 in the optical axis OA direction. Thus, since the movement of the opening member 31 is restricted by the wall portion 316b and the buffer member 40 in the direction in which the opening member 31 rotates around the buffer member 40 fitted in the fitting portion 315, the diaphragm device 30 can be positioned in the plane perpendicular to the optical axis OA.

Further, in the present embodiment, the wall portion 316b extends in the optical axis OA direction and is in contact with the buffer member 40 in the circumferential direction of the circle centered on the optical axis OA. Thus, the movement of the opening member 31 can be restricted by the wall portion 316b and the buffer member 40 in the direction in which the opening member 31 rotates around the first protruding portion 312a as a fulcrum.

Further, in the present embodiment, the opening member 31 has no wall portion extending in the optical axis OA direction at a position opposed to the third facing portion 223c of the plurality of facing portions in the optical axis OA direction. Thus, excessive restraint of the diaphragm device 30 can be suppressed.

Further, in the present embodiment, the plurality of facing portions 223 are fitted with the buffer members 40. Thus, the positions of the buffer members 40 with respect to the fixed barrel 22 can be fixed in the plane perpendicular to the optical axis OA and in the optical axis OA direction.

In the present embodiment, the opening member 31 has the main body 313, the first protruding portion 312a, the second protruding portion 312b and the third protruding portion 312c that protrude from the main body 313 in a direction intersecting the optical axis OA and are opposed to the plurality of facing portions 223, and the main body 313 has the slits 314 extending in the circumferential direction at positions opposed to the first protruding portion 312a, the second protruding portion 312b and the third protruding portion 312c in the radial direction. Thus, the vibration of the main body 313 can be inhibited from being transmitted to the first protruding portion 312a, the second protruding portion 312b, and the third protruding portion 312c, so that the vibration can be further inhibited from being transmitted to the fixed barrel 22, and the noise of the lens barrel 20 can be further reduced.

In the present embodiment, the plurality of buffer members 40 are made of engineering plastic or super engineering plastic. Thus, the diaphragm device 30 can be positioned by the buffer members 40, and the transmission of the vibration generated by the diaphragm device 30 to the fixed barrel 22 can be suppressed.

The plurality of buffer members 40 may be made of metal as long as the outside dimension of the lens barrel 20 before assembly of the lens barrel 20 and the outside dimension of the lens barrel 20 after assembly of the lens barrel 20 substantially coincide with each other, and the vibration transmission rate of the buffer members 40 is lower than that of the fixed barrel 22.

In the above-described embodiment, the buffer member 40 is an annular cylindrical member, but the present disclosure is not limited to this. The buffer member 40 may be, for example, a rectangular parallelepiped. In this case, the wall portion 316a of the fitting portion 315 of the opening member 31 and the wall portion 225 of the fitting portion 224 of the fixed barrel 22 may be in contact with at least a part of the surface of the buffer member 40 other than the surfaces in contact with the opening member 31 and the fixed barrel 22 in the optical axis OA direction.

In the above-described embodiment, the structure of the first protruding portion 312*a* to the third protruding portion 312*c* of the opening member 31 and the structure of the first facing portion 223*a* to the third facing portion 223*c* of the fixed barrel 22 may be reversed. Specifically, the first facing portion 223*a* of the fixed barrel 22 may be provided with a fitting portion that fits with the buffer member 40, the second facing portion 223*b* may be provided with a wall portion that is in contact with the outer periphery of the buffer member 40 in the circumferential direction of the circle centered on the optical axis OA, and the third facing portion 223*c* may be provided with no wall portion that is in contact with the buffer member 40. In this case, fitting portions that fit with the buffer member 40 may be formed in the first protruding portion 312*a*, the second protruding portion 312*b*, and the third protruding portion 312*c* of the opening member 31.

Further, although three buffer members 40 are provided in the above embodiment, the third protruding portion 312*c* of the opening member 31 may be omitted and two buffer members 40 may be provided. Further, four or more buffer members 40 may be provided by providing a plurality of any of the first protruding portion 312*a*, the second protruding portion 312*b*, and the third protruding portion 312*c*.

In the above embodiment, the diaphragm device 30 is attached to the fixed barrel 22, but the fixed barrel 22 may be a barrel that does not move in the optical axis OA direction or a barrel that moves in the optical axis OA direction. The fixed barrel 22 may be a lens holding frame that holds the lens.

The above-described embodiments are examples of preferred implementations. However, the present invention is not limited to this, and various modifications can be made without departing from the scope of the invention, and arbitrary constituent elements may be combined.

DESCRIPTION OF REFERENCE NUMERALS 1 camera
12 imaging element
20 lens barrel
22 fixed barrel
31 opening member
33 diaphragm blade
40 buffer member
223 facing portion
224 fitting portion
225 wall portion
226 seating surface
223*a* first facing portion
223*b* second facing portion
223*c* third facing portion
312*a* first protruding portion
312*b* second protruding portion
312*c* third protruding portion
313 main body
315 fitting portion
314 slit
316*a*, 316*b* wall portion
317*a*, 317*b* seating surface

The invention claimed is:

1. A lens barrel comprising:
a plurality of diaphragm blades;
a driver driving the plurality of diaphragm blades;
a first opening member that holds the driver;
a second opening member including a plurality of facing portions opposed to the first opening member in an optical axis direction; and
a plurality of buffer members disposed between the first opening member and the plurality of facing portions, respectively;
wherein the plurality of buffer members position the first opening member with respect to the second opening member.

2. The lens barrel according to claim 1, wherein the first opening member and the second opening member are not in contact with each other.

3. The lens barrel according to claim 1, wherein an outside dimension of each of the plurality of buffer members before assembly of the lens barrel is substantially equal to an outer dimension of each of the plurality of buffer members after assembly of the lens barrel.

4. The lens barrel according to claim 1, wherein the plurality of buffer members are members having a vibration transmission rate lower than that of the second opening member.

5. The lens barrel according to claim 1, wherein the first opening member has a fitting portion fitted with one of the buffer members at a position opposed to a first facing portion of the plurality of facing portions in the optical axis direction.

6. The lens barrel according to claim 5, wherein the fitting portion has a first wall portion extending in the optical axis direction and fitting with at least a part of the one of the buffer members.

7. The lens barrel according claim 1, wherein the first opening member has a second wall portion in contact with at least a part of one of the buffer members at a position opposed to a second facing portion of the plurality of facing portions in the optical axis direction.

8. The lens barrel according to claim 7, wherein the second wall portion extends in the optical axis direction and is in contact with the one of the buffer members in a circumferential direction of a circle centered on an optical axis.

9. The lens barrel according to claim 1, wherein the first opening member has a third facing portion of the plurality of facing portions.

10. The lens barrel according to claim 1, wherein the plurality of facing portions fit with the buffer members.

11. The lens barrel according to claim 1, wherein a first facing portion of the plurality of facing portions includes a fitting portion fitted with one of the buffer members.

12. The lens barrel according to claim 11, wherein a second facing portion of the plurality of facing portions has a wall portion in contact with the one of the buffer members in a circumferential direction of a circle centered on an optical axis.

13. The lens barrel according to claim 11, wherein a third facing portion of the plurality of facing portions has no wall portion extending in the optical axis direction.

14. The lens barrel according to claim 1,
wherein the first opening member has a main body that holds the driving unit, and a plurality of protruding portions that protrude from the main body in a direction intersecting an optical axis and face the plurality of facing portions, and
wherein the main body has slits extending in a circumferential direction of a circle at positions opposed to the protruding portions in a radial direction of the circle centered on the optical axis.

15. The lens barrel according to claim 1, wherein in a state in which the first opening member is not positioned with respect to the second opening member, a first buffer member, which is one of the plurality of buffer members, is not positioned in a circumferential direction with respect to the first opening member.

16. The lens barrel according to claim 15, wherein in the state in which the first opening member is not positioned with respect to the second opening member, a second buffer member, which is another one of the plurality of buffer members, is positioned in a radial direction and the circumferential direction with respect to the first opening member.

17. The lens barrel according to claim 16, wherein in the state in which the first opening member is not positioned with respect to the second opening member, a third buffer member, which is yet another one of the plurality of buffer members, is positioned in the circumferential direction and not positioned in the radial direction with respect to the first opening member.

18. The lens barrel according to claim 1, wherein the plurality of buffer members are made of engineering plastic or super engineering plastic.

19. An imaging apparatus comprising:
the lens barrel according to claim 1; and
an imaging element.

\* \* \* \* \*